INVENTOR.
Francis S. Genbauffe.
BY
HIS ATTORNEY.

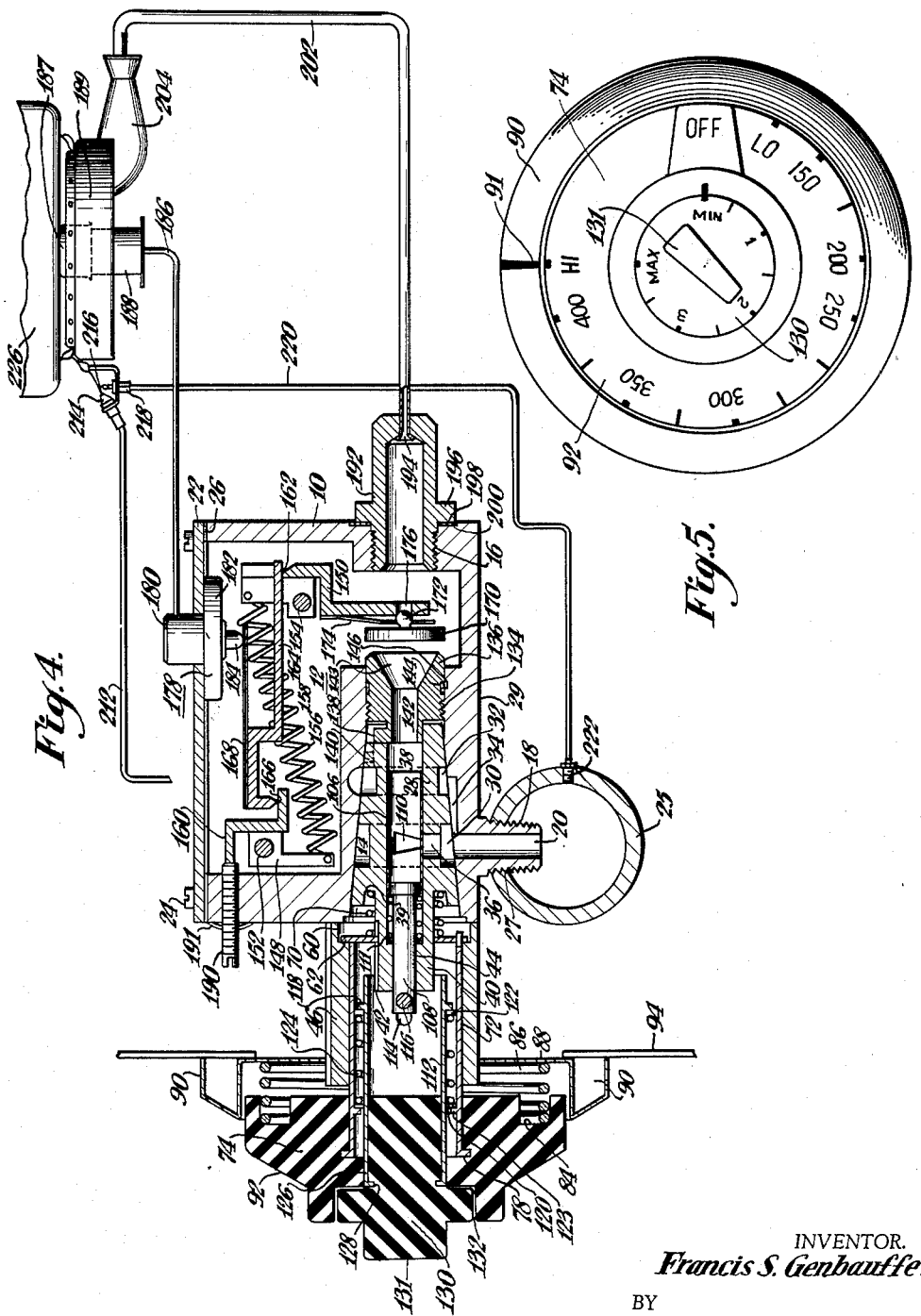

INVENTOR.
Francis S. Genbauffe.
BY
HIS ATTORNEY.

United States Patent Office 2,958,467
Patented Nov. 1, 1960

2,958,467

CONTROL DEVICES FOR FUEL BURNERS

Francis S. Genbauffe, Irwin, Pa., assignor to Robertshaw-Fulton Controls Company, Richmond, Va., a corporation of Delaware Filed Sept. 12, 1956, Ser. No. 609,438

6 Claims. (Cl. 236—99)

This invention relates to a device for controlling the flow of fuel to a burner or the like and more particularly to a control device including a manually operable fuel cock in combination with a thermostatically operated valve.

The control device is characterized by a fuel cock that is used to control the admission of fuel into a casing and to supply fuel to a pilot light in addition to controlling the movement of a valve seat. A valve member in the casing is cooperable with the valve seat to control the passage of fuel therethrough and is actuated by a pair of interconnected, rotatable levers in combination with a thermostatic element. The operational accuracy of the valve member is insured by the use of a calibration means and an ambient temperature compensating means in combination with the interconnected, rotatable levers, and the casing of the device is provided with a means which enables the device to be attached as a unit to a fuel manifold or the like in a single assembly operation.

The control device is also characterized by a drive means for the fuel cock which is cooperable with a locking means to positively lock the fuel cock in a position to prevent the flow of fuel through the device.

The preferred embodiment of the control device is further characterized by a flow adjustment means in combination with the fuel cock. The flow adjustment means is carried in an axial passage in the fuel cock to vary the flow of fuel passing therethrough and the movement or adjustment thereof is controlled independently of the movement or rotation of the fuel cock.

One object of the present invention is to control the movement of the valve member by means of a pair of interconnected, rotatable levers in combination with a thermostatic element or thermally responsive means.

Another object of the invention is to calibrate the control device by varying the limits of rotation of one of the interconnected levers used to control the movement of the valve member.

Another object of the invention is to change the temperature setting of the device by shifting the position of the valve seat relative to the valve member.

Another object of the invention is to control the flow of fuel to a pilot light through the fuel cock.

Another object of the invention is to utilize a flow adjustment means in combination with the fuel cock to vary the flow of fuel delivered by the control device.

Another object of the invention is to control the flow adjustment means independently of the adjustment or temperature setting rotation of the fuel cock.

Another object of the invention is to insure an adequate fuel supply recovery capacity for small increments of temperature change.

Another object of the invention is to permit the device to be attached as a unit to a fuel manifold or the like in a single assembly operation.

These and other objects of the present invention will become apparent from the following description taken in connection with the accompanying drawings, wherein:

Fig. 4 is a section taken along the line IV—IV of Fig. 2 and showing one environmental application of the device;

Fig. 5 is an end elevation of the temperature setting and flow adjustment dials;

Figure 1:
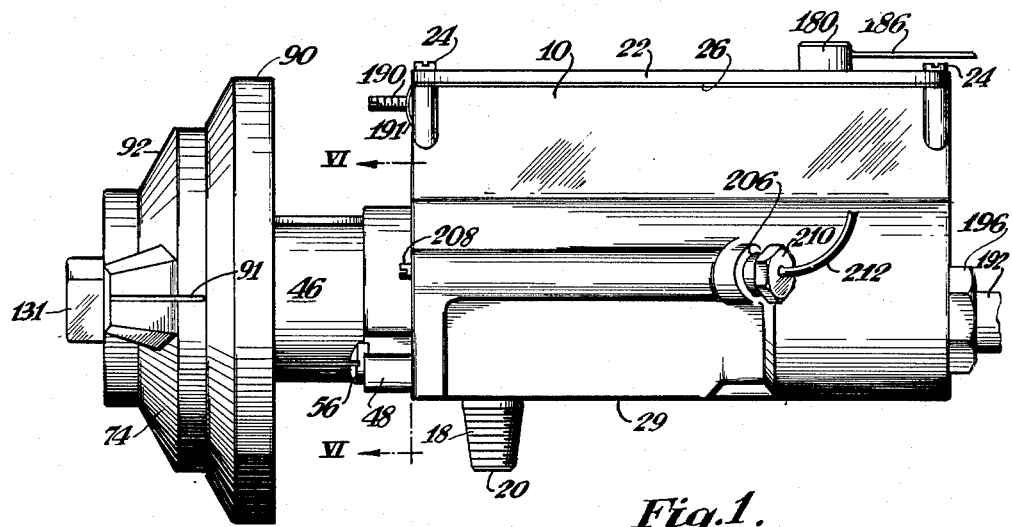
Fig. 1 is a side elevation of a preferred embodiment of the device.
Figure 2:
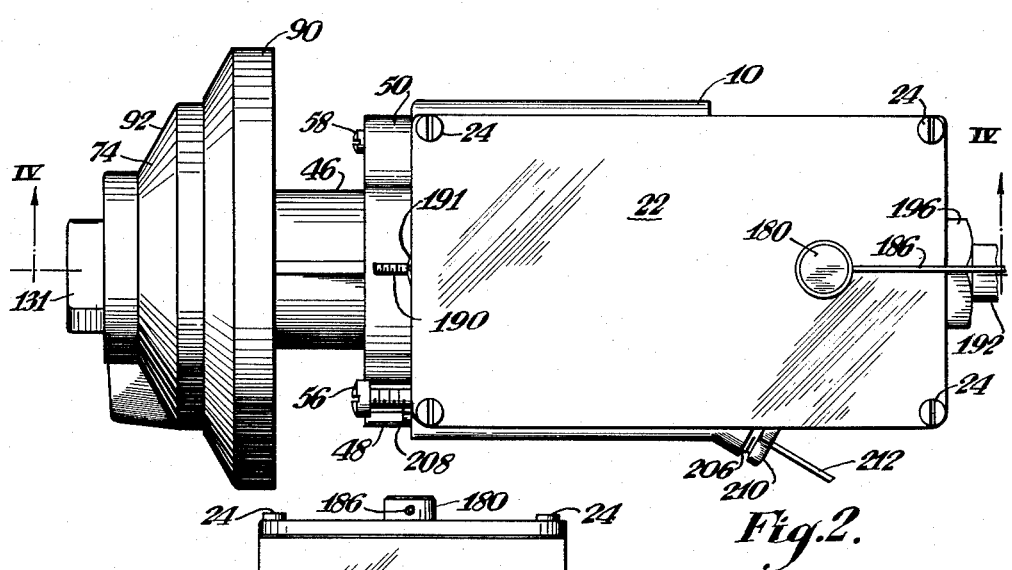
Fig. 2 is a top plan view.
Figure 3:
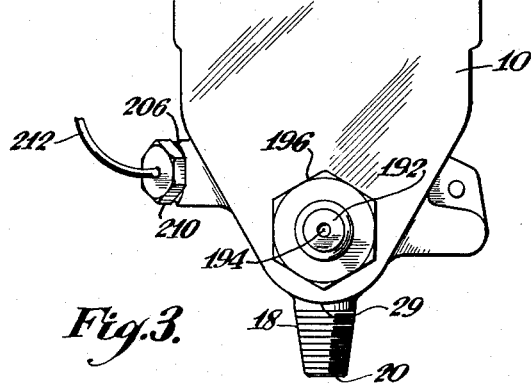
Fig. 3 is an end elevation.

Referring more particularly to Figs. 1 to 4 inclusive, the preferred embodiment of the device includes a casing 10 having a relatively large chamber 12 and a relatively small tapered chamber 14 therein and provided with a threaded outlet 16 in one wall thereof and a threaded nipple or mounting means 18 having an inlet passage 20 therein extending from another wall thereof. Casing chamber 12 is sealed by a cover 22 attached to casing 10 by a plurality of bolts 24 with a gasket 26 interposed between the cover and casing to provide a leakproof connection.

Threaded inlet nipple 18, in addition to providing an inlet for casing 10, also provides a means for attaching the control device to a fuel manifold 25. The inlet nipple 18 is carried in a threaded aperture 27 in the inlet manifold 25, and due to the configuration of the casing 10, the entire control device can be attached to the manifold 25 as a unit in a single assembly operation. It will be noted, particularly in Figs. 3 and 4, that the inlet nipple 18 projects downwardly from the casing bottom or undersurface 29 which extends longitudinally of the casing 10 substantially in the same plane and which is noticeably free of projections other than the inlet nipple 18. Due to this configuration of the casing 10 and the position of the inlet nipple 18 thereon, inlet nipple 18 can thereby be threaded into manifold aperture 27 upon rotation of casing 10 without interference between the manifold and any part of the casing.

A flow control means or fuel cock 28 having a pair of peripheral recesses or fuelways 30 and 32 therein is carried in tapered chamber 14. Both fuelways 30 and 32 communicate with the fuel inlet passage 20, fuelway 30 being substantially in alignment with fuel inlet 20 and fuelway 32 communicating with fuel inlet 20 through a recess 34 in the wall of tapered chamber 14. Fuel cock 28 is also provided with a transverse passage 36 and an axially extending passage 38 therein, passage 36 intersecting passage 38 and both passages being in communication with fuel inlet 20.

At the left end thereof, viewing Fig. 4, fuel cock 28 has an annular recess 39 therein and is provided with an integral stem 40 extending therefrom. Stem 40 is provided with a longitudinally extending keyway 42 on the peripheral surface thereof and is also provided with an axial passage 44 extending therethrough.

Figure 6:
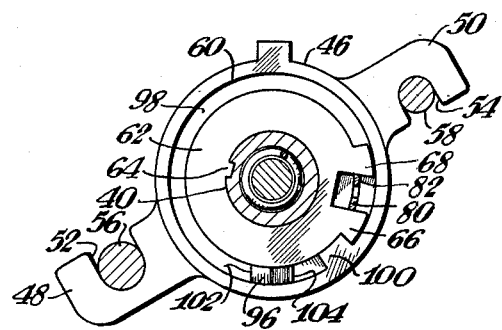
Fig. 6 is a section taken along the line VI—VI of Fig. 1.

A hollow bushing 46 (Figs. 2, 4, and 6) is carried exteriorly of casing 10 and extends from casing 10 substantially in axial alignment with tapered chamber 14. Bushing 46 is provided with a pair of diametrically opposed ears 48 and 50 thereon which are provided with a pair of transverse slots 52 and 54, respectively, therein. A pair of different size screws 56 and 58 are adapted to cooperate with slots 52 and 54, respectively, to secure the hollow bushing 46 to the casing 10, the different size screws 56 and 58 preventing incorrect assembly of the bushing and the casing. Hollow bushing 46 is also provided with an annular recess 60 therein at the inner end thereof.

Fuel cock 28 is adapted to be driven by a drive washer 62 which is carried in bushing recess 60 and which is provided with a tank 64 thereon that is seated in keyway 42 of the fuel cock. Drive washer 62 also has a pair of spaced tangs 66 and 68 extending from the outer periphery thereof. A compression spring 70 having one end thereof seated on drive washer 62 and the opposite end thereof seated in fuel cock recess 39 urges the drive washer 62 and the fuel cock 28 to their respective assembled operative positions.

A sleeve 72 (Fig. 4) is slidably and rotatably carried within hollow bushing 46 and has a temperature setting or indicating dial 74 keyed on the outer end thereof at 78. The inner end of sleeve 72 abuts drive washer 62 and is provided with a pair of spaced tangs 80 and 82 extending therefrom (Figs. 6 and 8) which are positioned between the spaced tangs 66 and 68 on drive washer 62. Tangs 66, 68 and 80, 82 provide a means to impart rotation to the fuel cock 28 upon rotation of temperature setting dial 74.

The temperature setting dial 74 is provided with an annular recess 84 therein which is adapted to seat one end of a compression spring 86. The opposite end of the compression spring 86 is seated on an end wall 88 of a bezel member 90 which surrounds the dial 74 and which is provided with a temperature indicating mark 91 thereon (Fig. 5) to register with suitable temperature indicia placed on the outer face 92 of temperature setting dial 74. Bezel 90 is retained on a panel member 94 (shown cutaway), panel 94 being part of a stove or the like to which the subject control device is connected and therefore not being a component part of the subject device.

Annular recess 60 in hollow bushing 46 is provided with a projection or cam 96 extending from the inner face 98 thereof, and the inner periphery of the recess 60 is provided with a radially inwardly extending stop lug 100 thereon. The peripheral length of cam 96 is just slightly less than the space separating the pair of tangs 66 and 68 on drive washer 62, and the cam 96 terminates along the inner face 98 of recess 60 in a pair of end walls 102 and 104 which form a pair of detents or a locking means for the drive washer tangs 66 and 68, respectively, the locking means to be discussed more in detail hereinafter. Lug 100 in recess 60 cooperates with tangs 66 and 68 on drive washer 62 to limit the degree of rotation thereof, tang 66 cooperating with lug 100 to limit the maximum flow "On" position or maximum counterclockwise rotation (viewing Fig. 5) of the fuel cock 28 and tang 68 cooperating with the lug 100 to define the flow preventing "Off" position or maximum clockwise rotation of the fuel cock 28.

A flow adjustment means or flow adjustment sleeve 106 (Fig. 4) is carried in the axial passage 38 within fuel cock 28 and is provided with a stem 108 thereon and a substantially triangular-shaped aperture 110 in the wall thereof. Aperture 110 is adapted to register with the transverse passage 36 in fuel cock 28 to provide for varying fuel flow therethrough for increments of rotation of sleeve 106 with respect to fuel cock 28. A compression spring 111 insures the registry of aperture 110 with fuel cock transverse passage 36.

Flow adjustment sleeve 106 is rotated by means of another sleeve 112 having a slot 114 therein which is adapted to receive a pin 116 attached to flow adjustment sleeve stem 108. Sleeve 112 is provided with an annular flange 118 thereon and is adapted to be positioned within the interior of sleeve 72 by means of a pair of washers 120 and 122 in combination with a compression spring 124, washer 122 abutting an annular flange 118 on sleeve 112 and washer 120 abutting an annular flange 123 on the inner periphery of sleeve 72.

Sleeve 112 is carried within an axial passage 126 in temperature setting dial 74 and is keyed at 128 to a flow adjustment dial 130 which is rotatably received within an annular recess 132 in the front face 92 of the temperature setting dial 74. Dial 130 is rotated by means of a handle or projection 131 extending substantially longitudinally thereof. Dial 130 is also provided with suitable indicia thereon (Fig. 5) to indicate the position of flow adjustment sleeve aperture 110 relative to fuel cock transverse passage 36 to thereby indicate the volume of fuel passing through aperture 110.

Tapered chamber 14 (Fig. 4) is threaded at 134 and is adapted to receive therein an exteriorly threaded, rotatable valve seat 136. Valve seat 136 is provided with a drive tang 138 thereon which is carried in a transverse slot 140 (shown in dotted lines) in fuel cock 28 and is provided with an axial passage 142 therein which is flared outwardly at 143 and which communicates with axial passage 38 in the fuel cock. Valve seat 136 is also provided with an annular recess 144 thereon which carries a seal 146. Thus, it will be apparent that upon rotation of the fuel cock 28, the valve seat 136 will be moved axially inwardly or outwardly of the tapered chamber 14.

A pair of rotatable levers 148 and 150 are rotatably mounted within casing chamber 12 on a pair of pins 152 and 154, respectively, and are resiliently interconnected by a pair of tension springs 156 and 158 (only one spring shown). Lever 148 is provided with a Z-shaped extension 160 thereon and lever 150 is formed with a knife edge 162 intermediate the ends thereof.

Levers 148 and 150 are also interconnected by a third lever or rigid means 164, lever 164 being slidably and pivotally carried by levers 148 and 150. Lever 164 is provided with a knife edge 166 at one end thereof which is seated on Z-shaped extension 160 of lever 148 and, adjacent the opposite end thereof, is seated on knife edge 162 of lever 150. Lever 164 also has affixed thereto a bimetallic strip or ambient temperature compensating element 168.

A valve member or valve disc 170 is operatively connected to rotatable lever 150 and is moved thereby between a plurality of controlling positions relative to valve seat 136. Valve member 170 has a spherical shaped lug 172 on one face thereof which is carried by a resilient member 174 rigidly attached to lever 150. Spherical lug 172 is adapted to seat within an aperture 176 in lever 150 to thereby provide a swivel or self-aligning connection between the valve member 170 and the rotatable lever 150.

A thermostatic element or thermally responsive means, generally designated by the reference numeral 178, is attached to casing cover 22 by a stud 180 and includes an extensible and retractible portion 182 having a thrust button 184 thereon, a capillary 186 and a sensing element 187. When the control device is installed in a position of intended use, such as on a stove or the like as shown in Fig. 4, sensing element 187 is surrounded by a shield 188 and the sensing element-shield assembly is disposed centrally of a burner 189 with the sensing element 187 in thermal contact with a cooking utensil 226 supported by the burner.

Portion 182 of the thermostatic element, capillary 186 and sensing element 187 are charged with a suitable liquid that undergoes a change in volumetric state when sensing element 187 reflects a change in a temperature condition to thereby produce a movement in one direction or the other of thrust button 184. Inasmuch as thermostatic elements of this type are well known in the art, further discussion of the structure and function thereof is deemed unnecessary. Suffice it to say that thrust button 184 operatively engages bimetallic strip 168 to impart rotary movement to levers 148 and 150 in response to a change in a temperature condition at sensing element 187.

A calibration screw 190 is carried by casing 10 and is positioned to abut one end of the Z-shaped extension 160 of rotatable lever 148. Calibration screw 190 effects the calibration of the device by limiting the counterclockwise rotation (viewing Fig. 4) of lever 148 to thereby vary the position of bimetallic strip 168 relative to thermostatic element thrust button 184. A resilient washer 191 is carried by calibration screw 190 to prevent accidental rotation thereof.

Threaded outlet passage 16 in casing 10 carries an exteriorly threaded spud 192 therein (Figs. 3 and 4) which has a fuel discharge orifice 194 in one end thereof. Spud 192 is provided with a hexagonal shaped, peripheral flange 196 thereon to accommodate the use of a suitable tool when threading spud 192 into outlet passage 16, and peripheral flange 196 is adapted to be seated on the machined face 200 of a recess 198 in the outer wall of casing 10. A conduit 202 connects spud 192 and burner inlet manifold 204 and thereby supplies burner 189 with fuel flowing through spud discharge orifice 194.

Referring again to Figs. 1 to 4 inclusive, casing 10 is also provided with a pilot light fuel passageway therein (not shown) which communicates with fuel cock fuelway 32 and which terminates on the exterior of casing 10 in a second casing outlet 206. Fuel flow through the pilot light passageway in casing 10 may be selectively adjusted by means of a flow adjustment screw 208. Outlet 206 carries a threaded plug 210 therein which receives one end of a flow conduit 212 (shown cutaway) that supplies fuel to a pilot light jet 214.

Pilot light jet 214 is carried by a bracket 216 mounted adjacent burner 189 and jet 214, being so positioned, forms a component of a two-phase pilot system. The other phase of the pilot system includes a small auxiliary pilot burner 218, also mounted on bracket 216, which is supplied with fuel by a flow conduit 220 that is attached by a threaded fitting 222 to fuel manifold 25. Being in direct communication with manifold 25, the auxiliary pilot burner 218 is thus constantly supplied with fuel and thereby continuously maintains a small pilot flame adjacent burner 189 and pilot light jet 214. The use of a small, continuous flame auxiliary pilot burner 218 is necessary for instantaneous ignition of burner 189 since the flow of fuel to pilot jet 214 is completely obstructed when the fuel cock 28 is rotated or turned to the "Off" position, as will be discussed more in detail hereinafter.

Figure 9:
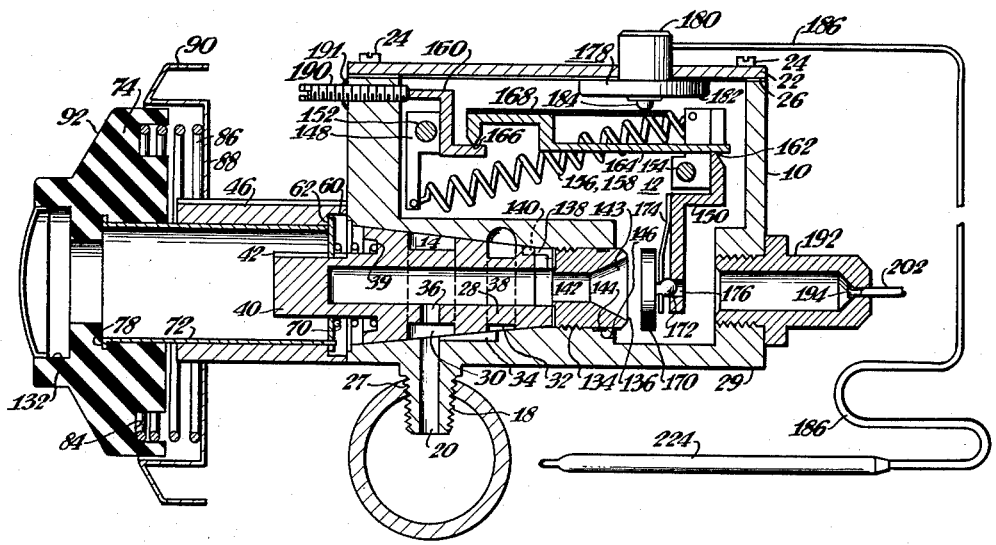
Fig. 9 is a longitudinal section through another embodiment of the device.

Fig. 9 shows another embodiment of the subject control device differing from the preferred embodiment only in that the flow adjustment sleeve 106 and the parts related thereto have been omitted and that the thermostatic element sensing element 187 has been replaced with an elongated capillary bulb 224. Inasmuch as the structure and function of the two embodiments is otherwise identical, further discussion of the embodiment of Fig. 9 is deemed unnecessary. Suffice it to say that the embodiment of the invention shown by Fig. 9 is particularly well adapted for use in controlling the flow of fuel to the burner of an oven or the like. Like reference numerals have been used to designate like structural components in the two embodiments.

Operation

Referring to Fig. 4, the control device is shown in a position of intended use wherein the threaded nipple 18 on casing 10 is carried by fuel manifold 25 and the spud orifice 194 is in communication with the burner 189. The fuel cock 28 has been rotated to a fuel "On" or high temperature position, and the fuel may flow from the manifold 25 through nipple inlet passage 20, through fuel cock transverse passage 36, through flow adjustment sleeve aperture 110, through fuel cock axial passage 38, through valve seat 136 past valve member 170, through spud orifice 194, and through conduit 202 to burner 189.

If the thermostatic element 178 senses a rise in temperature at sensing element 187, thrust button 184 will be moved downwardly and lever 164 will move rotatable lever 150 in a clockwise direction to thereby move the valve member 170 toward engagement with valve seat 136. As the predetermined dial set temperature is reached by sensing element 187, lever 150 will rotate valve member 170 into engagement with the valve seat 136 and terminate the flow of fuel therethrough.

Thereafter, if sensing element 187 reflects a reduction in temperature, thrust button 184 will be moved upwardly and rotatable lever 150 will be moved in a counterclockwise direction by springs 156 and 158 to thereby unseat the valve member 170. Due to the use of the pair of interconnected rotatable levers 148 and 150, it will be noted that a slight cooling of the sensing element 187 and a resultant small movement of thrust button 184 will produce a relatively large movement of the valve member 170, thus permitting a relatively large fuel flow to rapidly recover the temperature losses. The use of this multiple leverage system for controlling the movement of the valve member 170 to insure a large fuel recovery capacity for small increments of temperature changes at sensing element 187 compensates for the relatively small flow area afforded by the movable valve seat 136.

If it is desired to vary the flow of fuel through fuel cock 28 when dial 74 has been rotated to any given temperature setting, flow adjustment sleeve 106 may be rotated in one direction or the other independently of dial 74 by means of dial 130 to vary the size of flow adjustment sleeve aperture 110 relative to fuel cock transverse passage 36.

With fuel cock 28 in the position shown in Fig. 4, it will also be noted that fuel may pass from manifold 25 through inlet passage 20, through recess 34 in chamber 14, through fuel cock fuelway 32, through pilot light passageway (not shown) in casing 10, through second casing outlet 206, through conduit 212, and to the pilot jet 214. Fuel cock fuelway 32 in combination with chamber recess 34 thus insures full-flame, stable pilot light operation and provides a separate pilot light fuel passageway in the fuel cock 28 which is supplied independently of the main fuel flow through axial passage 38 in the fuel cock.

If dial 74 is moved clockwise (viewing Fig. 5) to move the dial from a high temperature setting to a lower temperature setting, valve seat 136 will be moved axially to the right (viewing Fig. 4) within chamber 14 and will move into engagement with valve member 170 to thereby terminate the flow of fuel through the valve seat. This axial movement of valve seat 136 will also produce a counterclockwise rotation of lever 150 which in turn will produce a counterclockwise rotation of lever 164 about thermostatic element thrust button 184. The counterclockwise rotation of lever 164 will in turn produce a clockwise rotation of lever 148 to thus move Z-shaped extension 160 of lever 148 out of engagement with calibration screw 190. This clockwise rotation of lever 148 against the bias of springs 156 and 158 permits lever 164 to move downwardly relative to thermostatic element thrust button 184 and thereby prevents damage to the thermostatic element 178 when the temperature setting dial 74 is roated from a high temperature setting to a lower temperature setting.

As the sensing element 187 cools after the dial 74 has been rotated from a high temperature setting to a lower temperature setting, the loading on lever 148 is such that lever 148 is rotated counterclockwise until Z-shaped extension 160 again seats on calibration screw 190. Any further retraction of the thrust button 184 due to the cooling of the sensing element 187 will permit springs 156 and 158 to rotate lever 150 in a counterclockwise direction to move valve member 170 out of engagement with valve seat 136. Lever 150 will continue to be rotated in a counterclockwise direction until sensing element 187 acquires the predetermined dial set temperature.

Figure 7:
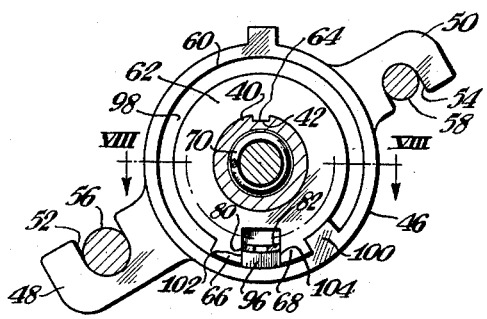
Fig. 7 is a section similar to Fig. 6, but with the fuel cock rotated to the locked or "Off" position.
Figure 8:
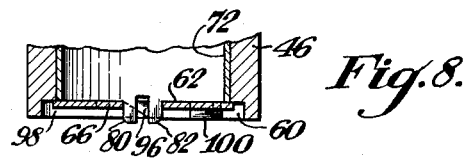
Fig. 8 is a section taken along the line VIII—VIII of Fig. 7.

If it is desired to completely terminate the flow of fuel through the control device, fuel cock 28 may be rotated clockwise (viewing Fig. 5) into the "Off" or locked position shown in Figs. 7 and 8. In this position of the fuel cock 28, fuelways 30 and 32 therein are completely sealed off from inlet passage 20, thereby terminating the fuel flow to both the main burner 189 and the pilot jet 214.

As the dial 74 is rotated clockwise to the "Off" position, tangs 66 and 68 on drive washer 62 move up over cam surface 96 and drop into engagement with detents 102 and 104, respectively, thus providing a lock against accidental rotation of the fuel cock 28 from the "Off" position. Compression spring 70 will firmly seat the drive washer tangs 66 and 68 on the inner face 98 of recess 60 and maintain their engagement with detents 102 and 104, respectively.

To unlock the dial 74, it is necessary to push dial 74 and sleeve 72 axially inward to move drive washer 62 axially inward along valve stem 40 against the bias of compression spring 70. When drive washer 62 has been moved axially inward to the point where the tangs 66 and 68 thereon are out of engagement with detents 102 and 104, respectively, dial 74 may be moved in a counterclockwise direction to again place fuel cock fuelways 30 and 32 in communication with fuel inlet passage 20.

While only two embodiments of the invention have been herein shown and described, it will be obvious to those skilled in the art that the invention may be variously embodied and that changes may be made in the construction and arrangement of parts without departing from the scope of the invention as defined in the appended claims.

It is claimed and desired to secure by Letters Patent:

1. In a thermostatically operated device for controlling the flow of fuel to a burner or the like, the combination comprising a casing having a plurality of chambers therein and provided with an inlet and an outlet for fuel, a fuel cock in one of said chambers to control the admission of fuel into said casing, said fuel cock having an axial passage and a transverse passage in communication with said casing inlet, a flow adjustment sleeve carried in said axial passage and provided with an aperture in the wall thereof adapted to register with said transverse passage in said fuel cock, means to rotate said flow adjustment sleeve to vary the position of said aperture therein relative to said transverse passage in said fuel cock to thereby adjust the flow of fuel admitted to said casing, a stem on said fuel cock, means including a drive means operatively connected to said fuel cock stem to rotate said fuel cock, locking means operatively associated with said drive means to lock said fuel cock in a position to prevent admission of fuel into said casing, a valve seat positioned in one of said chambers and operatively connected to said fuel cock, the rotation of said fuel cock being operative to move said valve seat axially of said chamber, a pair of rotatable levers in another of said chambers, resilient means interconnecting said pair of levers, rigid means interconnecting said pair of levers and slidably and pivotally carried thereon, thermally responsive means operatively engageable with said rigid means and being operable to rotate said levers in response to changes in a temperature condition reflected by said thermally responsive means, and a valve member resiliently carried by one of said levers and being movable therewith between a plurality of flow controlling positions relative to said valve seat.

2. A thermostatically operated device for controlling a flow of fuel to a burner comprising a casing having an inlet and an outlet, valve means operably disposed in said casing to regulate a flow of fuel to said outlet, flow control means rotatably disposed in said casing for controlling a flow of fuel thereinto and having a stem member extending through a wall of said casing, manually operable means connected to said stem member for rotating said flow control means, an operative connection between said flow control means and said valve means for positioning the same when said flow control means is rotated by said manually operable means, thermally responsive means operably associated with said valve means to operate the same in response to temperature variations, calibration means extending through the same wall of said casing as said stem member and being spaced from said stem member, and rotatable means operably connected between said calibration means and said valve means for adjusting the same independently of said flow control means.

3. The thermostatically operated device as recited in claim 2 wherein said rotatable means comprises a plurality of rotatable members, one of which is operably engageable by said calibration means and another of which is operatively connected to said valve means.

4. In a thermostatic control device, the combination comprising a casing having an inlet and an outlet, movable valve seat means disposed in said housing between said inlet and said outlet, a regulating valve member cooperating with said seat means and being operable to regulate a flow of fluid to said outlet, thermally responsive means operatively associated with said regulating valve member to operate the same in response to temperature variations, a rotatable flow control valve member having an inner portion for controlling a flow of fluid entering said casing from said inlet and an outer stem portion extending through a wall of said casing, dial means operably connected to said stem portion for rotating said flow control valve member between controlling positions, an operative connection between the inner portion of said flow control valve member and said seat means for positioning the same relative to said regulating valve member in response to rotation of said flow control valve member, a calibrating screw extending through the same wall of said casing as said stem portion, and rotatable means including one member operably engageable by said calibrating screw and another member operably connected to said regulating valve member whereby said calibrating screw rotates said rotatable means to adjust the position of said regulating valve member.

5. In a thermostatic control apparatus supplying a flow of fuel to a cooking vessel burner for maintaining a flame thereat, the combination comprising a casing having an inlet and an outlet, internal wall means in said casing defining a valve chamber in communication with said inlet and outlet, a portion of said wall means defining a fixed valve seat adjacent said inlet, a rotatable hollow valve member engageable with said fixed valve seat and having port means movable into and out of registry with said inlet to control a flow of fuel entering said casing, a hollow stem on one end of said valve member projecting exteriorly of said casing, connecting means on an opposite end of said valve member, a manually operable dial operably connected to said stem for rotating said valve member relative to said fixed valve seat, a movable valve seat carried by said wall means in said valve chamber, means on said movable valve seat cooperating with said connecting means to form a drive connection with said valve member for movement thereby when said dial is operated, a regulating valve member operatively disposed for cooperation with said movable valve seat to regulate the flow of fuel to said outlet, thermally responsive means operably associated with said regulating valve member for moving the same relative to said movable valve seat in response to temperature variations caused by the flame at said burner, a sleeve valve member mounted for rotation in said hollow valve member and cooperating with said port means to adjust the flow of fuel entering said casing and thereby regulate the flame at the burner to a selective height, and a manually operable adjustment knob rotatably carried by said dial and being operably connected to said sleeve valve member for rotating the same in said hollow valve member.

6. A thermostatic control device as recited in claim 5 wherein said sleeve valve member is provided with aperture means having a wall cooperating with a wall of said port means for varying the fluid flow through said port means.

References Cited in the file of this patent

UNITED STATES PATENTS

| | | |
|---|---|---|
| 1,149,046 | Hall | Aug. 3, 1915 |
| 1,561,915 | Ellis | Nov. 17, 1925 |
| 2,066,821 | Brumbaugh | Jan. 5, 1937 |
| 2,302,407 | Waddell | Nov. 17, 1942 |
| 2,307,443 | Atkinson | Jan. 5, 1943 |
| 2,328,642 | Green | Sept. 7, 1943 |
| 2,361,945 | Jackson | Nov. 7, 1944 |
| 2,487,436 | Goehring | Nov. 8, 1949 |
| 2,491,429 | Thomas | Dec. 13, 1949 |
| 2,607,530 | Eskin | Aug. 19, 1952 |
| 2,650,028 | Grayson | Aug. 25, 1953 |
| 2,738,158 | Fuglie | Mar. 13, 1956 |
| 2,807,423 | Eskin | Sept. 24, 1957 |

FOREIGN PATENTS

| | | |
|---|---|---|
| 582,088 | Germany | Aug. 8, 1933 |
| 626,299 | Great Britain | July 13, 1949 |
| 318,747 | Great Britain | Sept. 12, 1928 |